(12) United States Patent
Boisson et al.

(10) Patent No.: US 8,379,731 B2
(45) Date of Patent: Feb. 19, 2013

(54) METHOD AND DEVICE FOR RECONSTRUCTING A PICTURE

(75) Inventors: Guillaume Boisson, Pleumeleuc (FR); Patrick Lopez, Livre sur Changeon (FR); Jerome Vieron, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 107 days.

(21) Appl. No.: 12/452,768

(22) PCT Filed: Jul. 21, 2008

(86) PCT No.: PCT/EP2008/059520
§ 371 (c)(1),
(2), (4) Date: Aug. 30, 2010

(87) PCT Pub. No.: WO2009/013266
PCT Pub. Date: Jan. 29, 2009

(65) Prior Publication Data
US 2010/0322312 A1 Dec. 23, 2010

(30) Foreign Application Priority Data
Jul. 24, 2007 (FR) .................................... 07 56708

(51) Int. Cl.
*H04N 7/12* (2006.01)
*H04N 11/02* (2006.01)
*H04N 11/04* (2006.01)

(52) U.S. Cl. ......... 375/240.25; 375/240.12; 375/240.15; 382/238; 348/394.1; 348/409.1; 348/411.1; 348/415.1

(58) Field of Classification Search .................. 375/240.01–240.29; 382/238; 348/394.1, 409.1, 411.1, 415.1
See application file for complete search history.

(56) References Cited

U.S. PATENT DOCUMENTS
2004/0057523 A1 3/2004 Koto et al.
2004/0258154 A1* 12/2004 Liu et al. .................. 375/240.16
2007/0047652 A1* 3/2007 Maruyama et al. ...... 375/240.16

FOREIGN PATENT DOCUMENTS
EP 0648047 4/1995
EP 1610561 12/2005

OTHER PUBLICATIONS
Search Report Dated Oct. 6, 2008.

* cited by examiner

*Primary Examiner* — Sath V Perungavoor
*Assistant Examiner* — Nathnael Aynalem
(74) *Attorney, Agent, or Firm* — Tutunjian & Bitetto, P.C.

(57) ABSTRACT

The invention relates to a method for reconstructing a picture that is part of a sequence of pictures, from coded digital data, representative of said current picture. It comprises the following steps:

Figure 4:
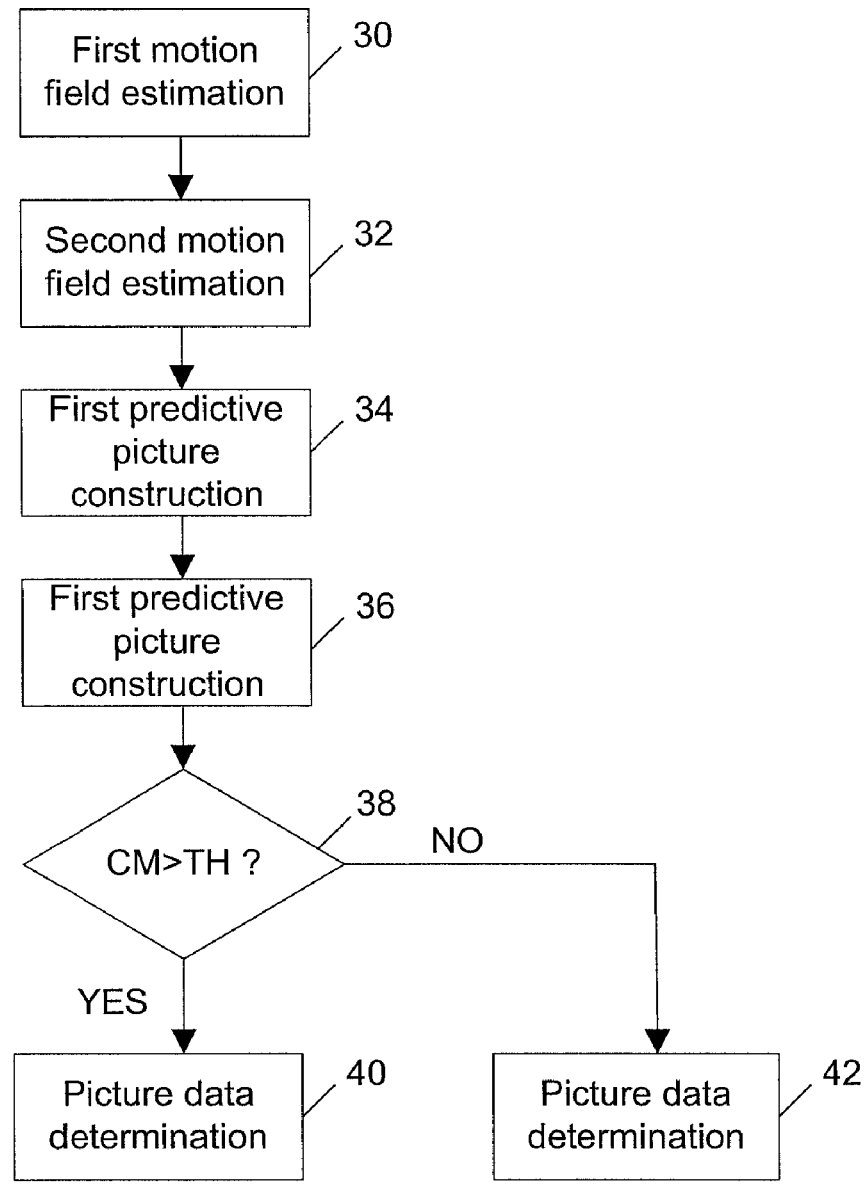

construct, for each picture block, first and second prediction blocks (from a first picture and a second picture previously reconstructed, and calculate, for each block, a confidence value representative of the proximity between the visual content of the first predictive block and the visual content of the second predictive block, and reconstruct each block from a part of said coded digital data representative of said block and initial auxiliary data calculated from the first and second predictive blocks when the block confidence value is greater than a predetermined threshold.

12 Claims, 4 Drawing Sheets

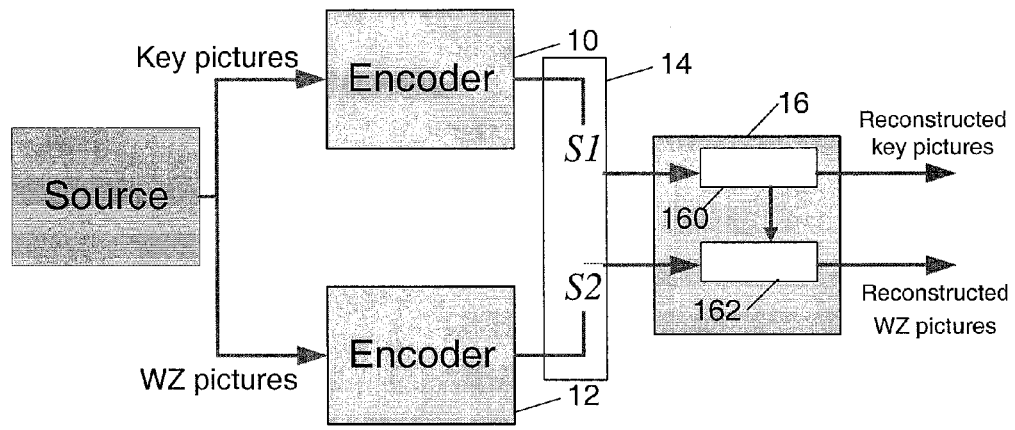
FIG.1 – PRIOR ART
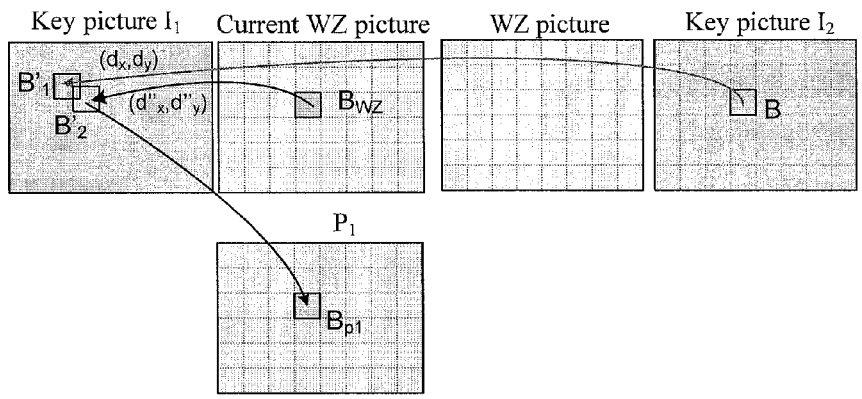
FIG.2 – PRIOR ART
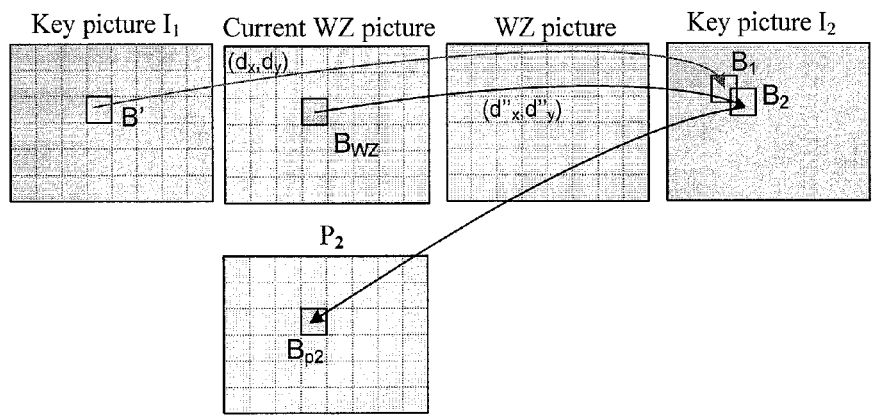
FIG.3 – PRIOR ART

METHOD AND DEVICE FOR RECONSTRUCTING A PICTURE

This application claims the benefit, under 35 U.S.C. §365 of International Application PCT/EP2008/059520, filed Jul. 21, 2008, which was published in accordance with PCT Article 21(2) on Jan. 29, 2009 in English and which claims the benefit of French patent application No. 0756708, filed Jul. 24, 2007.

1. SCOPE OF THE INVENTION

The invention relates to the video coding domain in general. It relates, in particular, to a method and device for reconstructing a picture that is part of a sequence of pictures, from coded digital data, representative of said sequence of pictures.

2. PRIOR ART

Video coders are known that are capable of receiving at input a sequence of pictures and coding the pictures of the sequence according to the INTRA mode, i.e. independently of the other pictures of the sequence or according to the INTER mode, i.e. by temporal prediction from other pictures of the sequence previously coded. Such coders known as predictive coders are particularly adapted for digital broadcast or streaming type applications in which the sequence is coded once and decoded several times. Such predictive coders are relatively complex compared to corresponding decoders because they implement a motion estimation. However motion estimation is costly in terms of memory resources and calculation time.

Moreover, with reference to FIG. 1, video coders are known that are capable of receiving a sequence of source pictures at the input. Such a coder comprises a standard coding module 10, of predictive type for example, able to code in INTRA mode pictures from a first sub-sequence of said sequence in the form of a first bitstream 51. The pictures of the first sub-sequence are called key pictures. Such coders also comprise, a second coding module 12 of Slepian-Wolf or Wyner-Ziv type, able to code, in the form of a second bitstream S2, other pictures of the sequence that are not key pictures independently of said key pictures. The S1 and S2 bitstreams can possibly be multiplexed into a single bitstream or can be transmitted on two independent channels. These pictures are called Wyner-Ziv pictures and termed WZ. Such a video coder, known as a distributed coder, is described in the document of B. Girod et al entitled Distributed Video Coding and published in the IEEE journal "special issues on advances in video coding and delivery". Such video coders are relatively simple compared to standard coders because they do not implement motion prediction. They are therefore particularly adaptable to applications using mobile digital cameras that require a low level of energy consumption. The two bitstreams S1 and S2 generated by the video coder are transmitted via a channel 14 to a decoder 16. It is also possible to consider sending S1 and S2 separately, each bitstream being transmitted via a dedicated channel. Such a decoder 16 is able to process at the same time the two bitstreams S1 and S2 that are sent to it via the channel 14 and to use the statistical dependencies between the key pictures and the WZ pictures, and between the various WZ pictures, in order to generate a sequence of reconstructed pictures. More precisely, the decoder 16 comprises a first decoding module 16 able to reconstruct the key pictures from a first binary stream S1. For this purpose, the first decoder module 160 is adapted to reconstruct the INTRA type pictures coded by the first coding module 10. The decoder 16 also comprises a second decoding module 162 able to reconstruct the WZ pictures from a second binary stream S2 and the auxiliary data. For this purpose, the second decoding module 162 is adapted to generate for each WZ picture auxiliary data using key pictures previously reconstructed. To do this, the second decoding module 162 comprises a motion estimation module able to estimate motion data to generate auxiliary data. For example, referring to FIG. 2, the motion estimation module is able to estimate a motion field, say backwards between a key picture $I_2$ following a current WZ picture and a key picture $I_1$ preceding the current WZ picture. For this purpose, a motion vector is associated with each of the blocks B of $I_2$, this vector being representative of motion between said block B and a block $B'_1$ of $I_1$. To each of these blocks $B_{WZ}$ of the WZ picture a motion vector is associated that is deduced from the motion vector associated with block B of the picture $I_2$ co-located with the current block $B_{WZ}$. Note $(d_x'',d_y'')$ the coordinates of the motion vector associated with block $B_{WZ}$, then $(d_x'',d_y'')=(\alpha*d_x,\alpha*d_y)$ or $(d_x,d_y)$ are the coordinates of the motion vector associated with block B of picture $I_2$ co-located with the current block $B_{WZ}$ and where $\alpha=p/N$, where (N−1) is the number of WZ pictures between the pictures $I_1$ and $I_2$ and p is the index of the current WZ picture, $p\geq 1$. From the motion vectors associated with each of the current WZ picture blocks a predictive picture of the current WZ picture, noted as $P_1$, is constructed. In this predictive picture $P_1$, the block $B_{p1}$ co-located with the current block $B_{WZ}$ is a copy of block $B'_2$ of the picture $I_1$ pointed by the motion vector $(d_x'',d_y'')$. This predictive picture $P_1$ represented by the auxiliary data used to reconstruct the current WZ picture.

In the same way, a second predictive picture $P_2$ can be constructed by reversing the role of the key pictures $I_1$ and $I_2$ as shown in FIG. 3. For this purpose, a forward motion field is estimated between the key picture $I_1$ and key picture $I_2$. In this case $(d_x'',d_y'')=((1-\alpha)*d_x,(1-\alpha)*d_y)$ where $(d_x,d_y)$ are the coordinates of the motion vector associated with block B' of picture $I_1$ co-located with current block $B_{WZ}$. From the motion vectors associated with each of the current WZ picture blocks, a predictive picture of the current WZ picture, noted $P_2$, is constructed. In this predictive picture $P_2$, the block $B_{p2}$ co-located with the current block $B_{WZ}$ is a copy of block $B'_2$ of the picture $I_2$ pointed by the motion vector $(d_x'',d_y'')$. This predictive picture $P_2$ comprises the auxiliary data used to reconstruct the current WZ picture.

Such decoders 16 are more complex than standard decoders because they implement a motion estimation. They also present the inconvenience of inefficiency in some configurations as for example in the cases of scene changes, fading and occlusions. In fact, in such configurations it is difficult to implement a correct motion estimation.

3. SUMMARY OF THE INVENTION

The purpose of the invention is to compensate for at least one disadvantage of the prior art.

The invention relates to a method for picture reconstruction, called current picture, being part of a sequence of pictures, from coded digital data representative of the current picture itself divided into blocks of pixels. The method comprises the following stages:

construct for each current picture block, a first prediction block from a first picture and a second picture from the sequence previously reconstructed, construct for each current picture block, a second prediction block from the first picture and the second picture, calculate, for each current picture block, a value, called confidence value, representative of the proximity between the visual content of the first predictive block and the visual content of the second predictive block, and reconstruct each block of the current picture:

from a part of coded digital data representative of the block and initial auxiliary data calculated from the first and second predictive blocks if the block confidence measurement is greater than a predetermined threshold, and from other digital data if the confidence measurement of the block is less than or equal to the threshold.

Advantageously, by not taking into account the picture data of predictive pictures if they are judged to be non pertinent with respect to a predefined criterion, the invention allows improvement in the quality of WZ picture reconstruction in configurations such as fading, scene changes, etc. configurations in which a motion estimation does not offer pertinent information.

According to a first aspect of the invention, the confidence value is a decreasing function of the sum of absolute values of pixel to pixel differences between the first predictive block and the second predictive block.

According to a variant, the confidence value is a decreasing function of the sum of absolute values of level to level differences between a histogram of the first predictive block and a histogram of the second predictive block.

According to a second aspect of the invention, the first auxiliary data is equal to the average pixel to pixel of the first and second predictive blocks.

According to a third aspect of the invention, the other digital data is constituted by data from the coded digital data part representative of the block and second auxiliary data.

According to a particular characteristic, the second auxiliary data is calculated from picture data of the current picture previously reconstructed.

The invention also relates to a device for the reconstruction of a sequence of pictures, from coded digital data representative of the sequence of pictures, the pictures being divided into blocks of pixels. The device comprises:

first decoding means to reconstruct the first pictures of the sequence, said key pictures, means to construct first and second predictive blocks for every block of each of the other pictures of the sequence from a first picture and a second picture of the sequence previously reconstructed, comparison means, to calculate for every block of each of the other pictures of the sequence, a value, said confidence value, being representative of the proximity between the visual content of the first predictive block and the visual content of the second predictive block of the block, and second decoding means to reconstruct each block of every picture of the sequence, from a part of coded digital data representative of the block and initial auxiliary data calculated from the first and second predictive blocks if the block confidence measurement is greater than a predetermined threshold, and from other digital data if the confidence measurement of the block is less than or equal to the threshold.

4. LIST OF FIGURES

Figure 5:
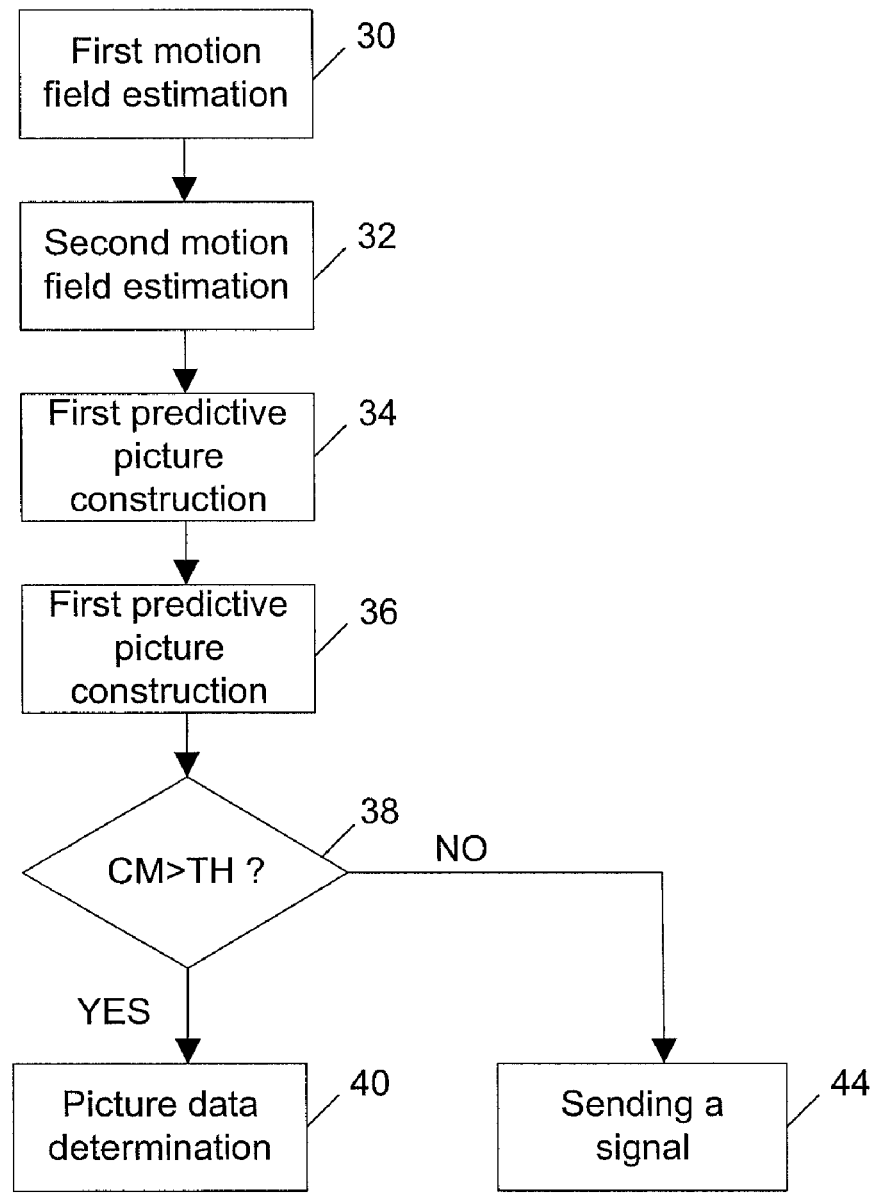
Figure 6:
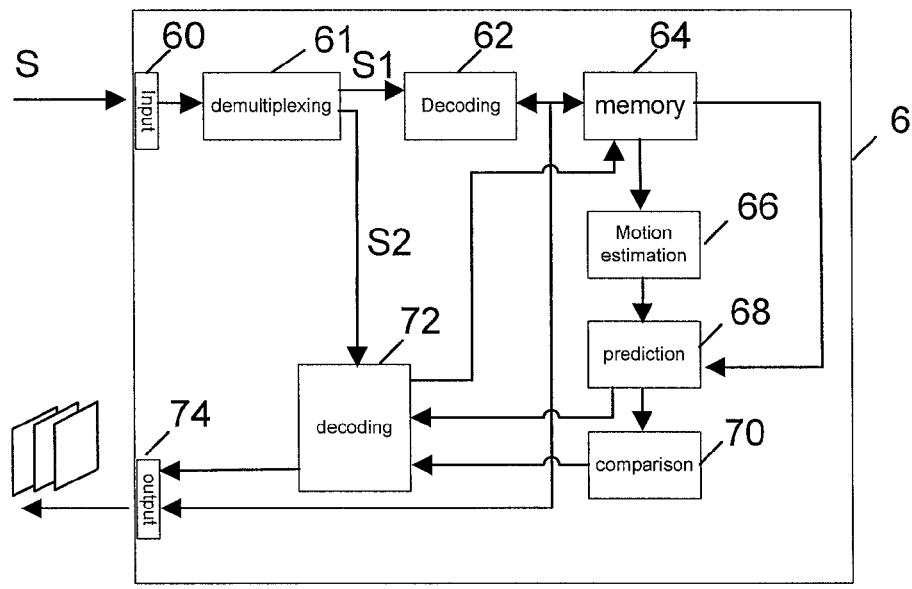
Figure 7:
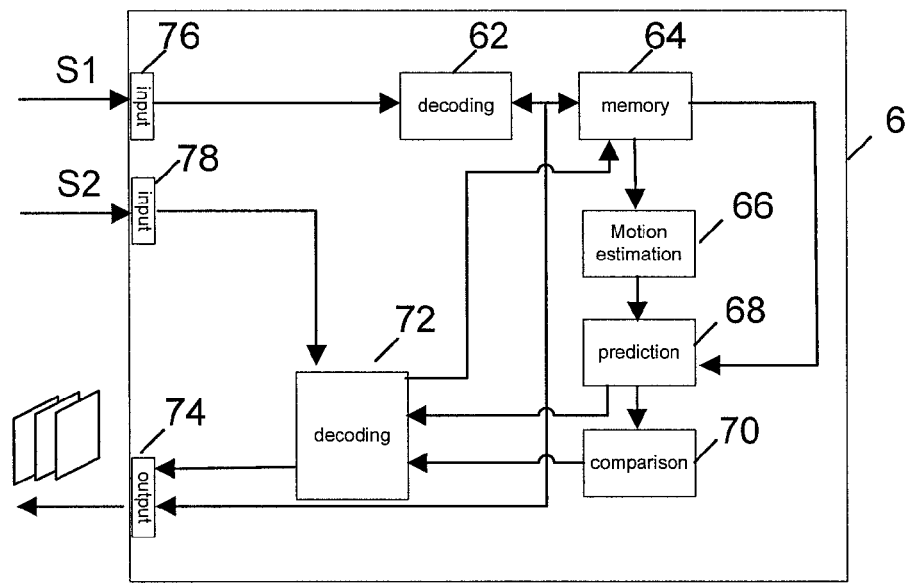

The invention will be better understood and illustrated by means of embodiments and implementations, by no means limiting, with reference to the figures attached in the appendix, wherein:

FIG. 1 illustrates a method of distributed coding/decoding as known in the art,

FIG. 2 illustrates a method of estimation of the motion field backwards and motion compensation with a view to construction of a first predictive picture, FIG. 3 illustrates a method of estimation of the motion field forwards and motion compensation with a view to the construction of a second predictive picture, FIG. 4 illustrates a decoding method according to the invention, FIG. 5 illustrates a variant of the decoding method according to the invention, FIG. 6 illustrates a decoding device according to the invention, and FIG. 7 illustrates a variant of the decoding device according to the invention.

5. DETAILED DESCRIPTION OF THE INVENTION

A known implementation of a Slepian-Wolf type coding method, is called the syndrome method. Let us assume that a symbol X takes its values from the set $E=\{X_1, X_2, \ldots X_N\}$. Prior to coding the symbol X, the E set is divided into K classes. To code the symbol X, the $k_x$ index of the class to which it belongs, is coded, with $k_x \in \{0, 1, \ldots K-1\}$. By decoding, for the symbol X, the index value of the class to which it belongs, noted as $k_x^{rec}$, it is possible to reconstruct the value of the symbol X. This value, noted as $X^{rec}$ is the value of the $k_x^{rec}$ index class that is the most probable with regard to an auxiliary data. The auxiliary data is generated from symbols previously reconstructed. In the particular case of video, the WZ pictures are coded according to the syndrome method. The picture data values, such as luminance or chrominance, associated with each pixel are integer values comprised in the interval [0; 255]. This interval is divided into K classes. Each k index class comprises [0; 255] interval integer values that are congruent to k modulo K. For example, if K=10, the 0 index class comprises the integer values of [0; 255] congruent to 0 modulo 10, the class 1 comprises integer values of [0; 255] congruent to 1 modulo 10 etc. More precisely, the index class 0 comprises the values $\{0, 10, 20, 30, \ldots, 230, 240, 250\}$ and the index class 1 comprises the values $\{1, 11, 21, 31, \ldots, 231, 241, 251\}$. Each coordinate pixel (p,q) of a picture WZ is associated with an index, noted as $k_{p,q}$, equal to the class to which belongs the value of the picture data associated with said pixel. For example if the value of the pixel picture data at coordinates (p,q) is equal to 30 then $k_{p,q}=0$, if the value of the picture data is equal to 44 then $k_{p,q}=4$. The indexes associated with each of the pixels of the WZ pictures are coded in binary form for example by an entropic coding method. The coded indexes are transmitted via a channel with a view to a decoding later.

The invention relates to a method for reconstruction of a WZ picture or a part of such a picture, a block of pixels for example. The method for the reconstruction of a WZ picture divided into blocks of pixels is described hereafter with reference to FIGS. 4 and 5.

At stage 30, a first motion field, say backwards, is estimated. This first motion field is representative of the motion of a second picture $I_2$ subsequent to the current WZ picture towards a first picture $I_1$ temporarily precedent to the current WZ picture, the first picture and the second picture having been previously reconstructed. These two pictures can be two key pictures or two WZ pictures or a key picture and a WZ picture. Also, according to a variant, the first picture and the second picture temporarily preceding the WZ picture or temporarily following the WZ picture. This motion field is, for example, estimated by a method of block matching i.e. that a forward motion vector is estimated for each current WZ picture block. Such a method allows estimation of translational motions. Any other motion model can be used.

At stage 32, a second motion field, say forwards, is estimated. This second motion field is representative of the movement of the first picture $I_1$ towards the second picture $I_2$. This motion field is, for example, estimated by a method of block matching i.e. that a backward motion vector is estimated for each current WZ picture block. Any other motion model can be used.

At stage 34, a first predictive picture $P_1$ of the current WZ picture, called the forward predictive picture, is constructed from the first motion field and the first picture as described in the prior art in reference to FIG. 2. The predictive picture $P_1$ is constituted of blocks. Each $P_1$ block is a predictive block of the $B_{WZ}$ block of the current WZ picture co-located with said block $P_1$.

At stage 36, a second predictive picture $P_2$ of the current WZ picture, called the backward prediction picture, is constructed from the second motion field and the second picture as described in the prior art in reference to FIG. 3. The predictive picture $P_2$ is constituted of blocks. Each $P_2$ block is a predictive block of the $B_{WZ}$ block of the current WZ picture co-located with said block $P_2$.

At stage 38, one or more confidence values are calculated for the current WZ picture. These values are representative of the proximity between the visual content of the first predictive picture $P_1$ and the visual content of the second predictive picture $P_2$. For this purpose, the pixel to pixel differences between the two predictive pictures are calculated. The difference associated with the pixel at coordinates (p,q) is noted as diff(p,q).

According to a first embodiment a confidence value, noted as $CM(B_{WZ})$, is calculated for each $B_{WZ}$ block of the current WZ picture. It is for example, calculated as follows:

$$CM(B_{WZ}) = \frac{1}{\sum_{(p,q) \in B_{WZ}} |diff(p, q)|}.$$

According to a variant, the histograms of the two prediction blocks $B_{p1}$ and $B_{p2}$ of block $B_{WZ}$ are constructed and the value $CM(B_{WZ})$ is then calculated as follows:

$$CM(B_{WZ}) = \frac{1}{\sum_{n_g \in NG} |diff\_hist(n_g)|}$$

where diff_hist(ng) is the difference between the histogram value of $B_{p1}$ associated with an $n_g$ level and the histogram value of $B_{p2}$ associated at $n_g$ level and where $NGB_{p2}$ is the set of possible $n_g$ values. An $n_g$ level represents for example a level of luminance. $B_{p1}$ is the block of $P_1$ co-located with the $B_{WZ}$ current block and $B_{p2}$ is the block of $P_2$ co-localized with the $B_{WZ}$ current block. If the $CM(B_{WZ})$ confidence value calculated for the $CM(B_{WZ})$ current block in the WZ picture is superior to a predefined threshold TH then the two prediction blocks $B_{p1}$ and $B_{p2}$ of the current block constructed at stages 34 and 36 are considered as having a visual content sufficiently close and are used as auxiliary data to reconstruct the picture data associated with the pixels of the $B_{WZ}$ block. For example, the average value of picture data of pixels at coordinates (p,q) in the two prediction blocks $B_{p1}$ and $B_{p2}$ is used as auxiliary data at stage 40 to determine the value of the picture data of the pixel at coordinates (p,q) in the reconstructed WZ picture. This last value is determined from the index decoded for this pixel, itself determined from part of the second bitstream S2 representative of this pixel, and the associated auxiliary data. For example, if the index decoded for the current pixel is 1 and if the auxiliary data calculated for this pixel is 33, then the picture data value 31 is associated with this pixel. In fact, it is the value of the index class 1 closest to the calculated auxiliary data.

If however, the $CM(B_{WZ})$ calculated for the current block $B_{WZ}$ is less than or equal to the predefined threshold TH then the two predictive blocks $B_{p1}$ and $B_{p2}$ of the current block are not used as auxiliary data to reconstruct the picture data of the current $B_{WZ}$ block pixels. In fact, the two predictive blocks $B_{p1}$ and $B_{p2}$ are considered as being non-pertinent. In this case, other auxiliary data is used during stage 42 to determine the value of picture data of the current $B_{WZ}$ block pixels. For example, the average value of picture data previously reconstructed associated with neighbouring pixels of the $B_{WZ}$ current block in the WZ picture can be used as auxiliary data.

According to a variant illustrated in FIG. 5, if the confidence value calculated for the current block $B_{WZ}$ is less than or equal to the predefined threshold TH then a signal is sent to the coder during stage 44 indicating that the information available is not sufficient to reconstruct the pixels of the current $B_{WZ}$ block and that it is necessary to re-send the information. This solution can be considered when a return channel exists from the decoding device to the coding device.

According to a second embodiment, a confidence value is calculated at the level of the current WZ picture, i.e. the same confidence value is associated with each current WZ picture block. It is noted that $CM(I_{WZ})$ is, for example, calculated as follows:

$$CM(I_{WZ}) = \frac{1}{\sum_{(p,q) \in I_{WZ}} |diff(p, q)|}.$$

Advantageously, by not taking into account the picture data of predictive pictures of the WZ picture if they are judged to be non pertinent with respect to a predefined criterion, the invention allows improvement in the quality of WZ picture reconstruction, particularly in configurations such as fading, scene changes, etc. configurations in which motion estimation does not offer pertinent information.

The invention also relates to a decoding device described in reference to FIGS. 6 and 7. In these figures, the modules represented are functional units, that can (or cannot) correspond to physically distinguishable units. For example, these modules or some of them can be grouped together in a single component, or constitute functions of the same software. On the contrary, some modules may be composed of separate physical entities. Moreover, these figures only show the essential components of the invention. The decoding device 6 can comprise other elements not represented and well known to those skilled in the art, for example a module for post processing reconstructed pictures.

The decoding device 6 comprises particularly an input 60, possibly a demultiplexing module 61, a first decoding module 62, a memory 64 a motion estimation module 66, a predictive module 68, a comparative module 70, a second decoding module 72, and an output 74.

The input 60 is adapted to receive a bitstream S representative of a sequence of pictures from a distributed coding of said picture sequence.

The demultiplexing module 61 is able to demultiplex the bitstream S received at the input 60 so as to separate the bitstream into a first bitstream S1 representative of key pictures and a second bitstream S2 representative of WZ pictures. This module is optional. In fact, according to a variant represented in FIG. 7, the decoding device comprises two inputs, the first input 76 being able to receive a first bitstream S1 representative of key pictures and the second input 78 being able to receive a second bitstream S2 representative of WZ pictures.

The first decoding module 62 is able to reconstruct the key pictures from a first bitstream S1 received from the demultiplexing module. For this purpose, the first decoding module implements a H.264 type decoding if the key pictures are coded in accordance with this standard. According to a variant, the first decoding module 62 implements an MPEG-2 type decoding if the key pictures are coded in accordance with this standard. The key pictures thus reconstructed are stored in the memory 64 and transmitted at the output 74.

According to an essential characteristic of the invention, the motion estimation module 66 is able to estimate, in accordance with stages 30 and 32 of the method, a first motion field and a second motion field between a first reconstructed picture and a second reconstructed picture stored in the memory 64. These reconstructed pictures are either two key pictures or a key picture and a WZ picture or two WZ pictures. The prediction module 68 is able to construct for a current WZ picture, in accordance with stage 34 of the method of the invention, a first predictive picture $P_1$, said forward predictive picture, according to a first motion field received from the motion estimation module 66 and the first and second reconstructed pictures stored in the memory 64. The predictive module 68, is also able to construct for the current WZ picture, in accordance with the step 36 of the method of the invention, a second predictive picture $P_2$, said backwards predictive picture, according to the second motion field received from the motion estimation module 66 and the first and second reconstructed pictures stored in the memory 64.

The comparative module 70 is able to calculate, in accordance with step 38 of the method of the invention, one or more confidence values per WZ picture that are representative of the proximity between the visual content of the first predictive picture $P_1$ and the visual content of the second predictive picture $P_2$, said two predictive pictures being received from the predictive module 68. For this purpose, the comparative module 70 calculates the difference pixel by pixel between the forward predictive picture and the backwards predictive picture.

The decoding module 72 is able to reconstruct in accordance with stages 40 or 42 of the method of the invention WZ pictures from the second bitstream S2 received from the demultiplexing module 61 or from output 78 and possibly forward and backward predictive pictures according to confidence values received from the comparative module 70. The WZ pictures thus reconstructed are then transmitted by the decoding module 72 to output 74.

Of course, the invention is not limited to the embodiment examples mentioned above. In particular, the person skilled in the art may apply any variant to the stated embodiments and combine them to benefit from their various advantages.

The invention claimed is:

1. Reconstruction method of picture, called current picture, being part of a sequence of pictures, from coded digital data representative of said current picture which is divided into blocks of pixels, said method comprising the following steps:

construct, for each current picture block, a first predictive block from a first picture and a second picture from said sequence previously reconstructed, construct, for each current picture block, a second predictive block from said first picture and said second picture, calculate, for each current picture block, a value, called confidence value, representative of the proximity between the visual content of the first predictive block and the visual content of the second predictive block, and reconstruct each current picture block from a part of said coded digital data representative of said current picture block and from first auxiliary data calculated from the first and second predictive blocks when the confidence value of said block is greater than a predetermined threshold.

2. Method according to claim 1, wherein said confidence value is a decreasing function of the sum of the absolute values of pixel to pixel differences between the first predictive block and the second predictive block.

3. Method according to claim 1, wherein said confidence value is a decreasing function of the sum of the absolute values of level to level differences between a histogram of the first predictive block and a histogram of the second predictive block.

4. Method according to claim 1, wherein first auxiliary data is equal to the pixel to pixel average of the first and second predictive blocks.

5. Method according to claim 1, further comprising reconstructing each current picture block from other digital data when the confidence measurement of said block is less than or equal to said threshold, wherein said other digital data is comprised of data of said coded digital data representative of said block and of second auxiliary data.

6. Method according to claim 5, wherein second auxiliary data is calculated from reconstructed picture data of said current picture.

7. Reconstruction device of a sequence of pictures, from coded digital data representative of said sequence of pictures, said pictures being divided into blocks of pixels, said device comprising:

first decoding means to reconstruct the first pictures of said sequence, referred to as key pictures, means to construct first and second predictive blocks for every block of each of the other pictures of said sequence from a first picture and a second picture of said sequence previously reconstructed, comparison means, to calculate for every block of each of the other pictures of said sequence, a value, referred to as confidence value, being representative of the proximity between the visual content of the first predictive block and the visual content of the second predictive block of said block, and second decoding means to reconstruct each block of every picture of said sequence from a part of said coded digital data representative of said block and from first auxiliary data calculated from the first and second predictive blocks when the confidence value of said block is greater than a predetermined threshold.

8. Reconstruction device according to claim 7, wherein said confidence value is a decreasing function of the sum of the absolute values of pixel to pixel differences between the first predictive block and the second predictive block.

9. Reconstruction device according to claim 7, wherein said confidence value is a decreasing function of the sum of the absolute values of level to level differences between a histogram of the first predictive block and a histogram of the second predictive block.

10. Reconstruction device according to claim 7, wherein said first auxiliary data is equal to the pixel to pixel average of the first and second predictive blocks.

11. Reconstruction device according to claim 7, wherein said second decoding means reconstruct each current picture block from other digital data when the confidence measurement of said block is less than or equal to said threshold, said other digital data being comprised of data of said coded digital data representative of said block and of second auxiliary data.

12. Reconstruction device according to claim 7, wherein said second auxiliary data is calculated from reconstructed picture data of said current picture.

* * * * *